United States Patent [19]

Kurata

[11] Patent Number: 4,510,524

[45] Date of Patent: Apr. 9, 1985

[54] COLOR PICTURE READING SYSTEM

[75] Inventor: Masami Kurata, Kanagawa, Japan

[73] Assignee: Fuji Xerox Co., Ltd., Tokyo, Japan

[21] Appl. No.: 401,432

[22] Filed: Jul. 23, 1982

[30] Foreign Application Priority Data

Jul. 24, 1981 [JP] Japan .................................. 56-115322

[51] Int. Cl.³ ............................................... H04N 1/46
[52] U.S. Cl. .......................................... 358/80; 358/75
[58] Field of Search .......................... 358/280, 80, 75; 382/54, 55

[56] References Cited

U.S. PATENT DOCUMENTS 4,003,024 1/1977 Riganati et al. ......................... 382/49

Primary Examiner—Richard Murray
Attorney, Agent, or Firm—Sughrue, Mion, Zinn, Macpeak & Seas

[57] ABSTRACT

A color picture reading system including a correction circuit for correcting the output signal to eliminate color noise. In color picture reading systems the image of a picture element is optically separated into two or more color signals. Due to errors in the mounting position of optical sensors, color noise in the form of a color signal being erroneously present in the optical output occurs at the boundary of a color change in the picture. A correction is made by detecting the color signals resulting from the scanning of neighboring picture elements and deciding upon the correctness of a given color signal based upon the continuity of color information from the surrounding picture elements.

8 Claims, 22 Drawing Figures

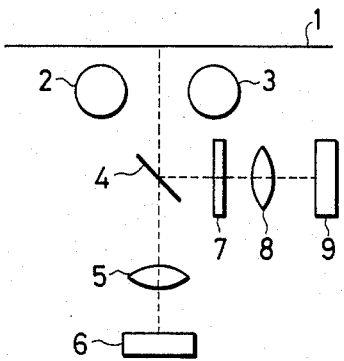
FIG. 1
PRIOR ART
FIG. 2
PRIOR ART
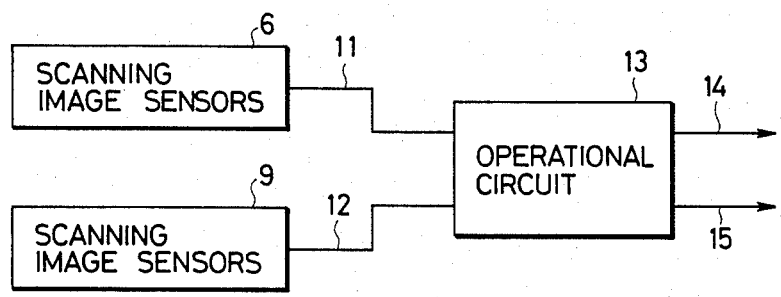
FIG. 3
PRIOR ART
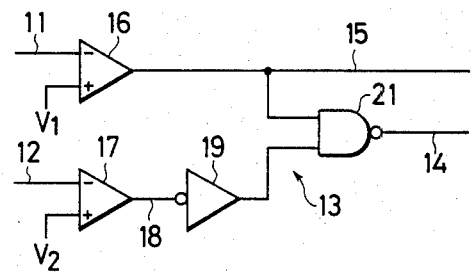
FIG. 4
PRIOR ART
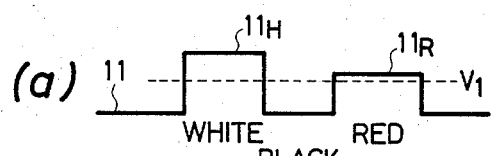
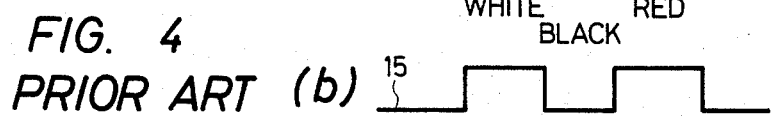
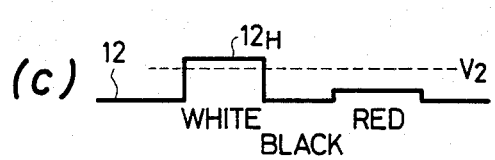

FIG. 10
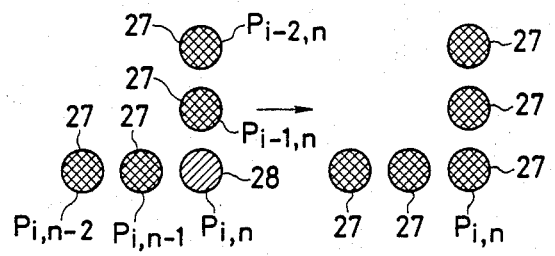
FIG. 11(a)    FIG. 11(b)
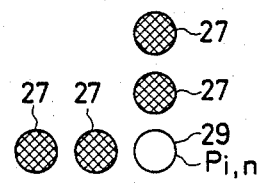 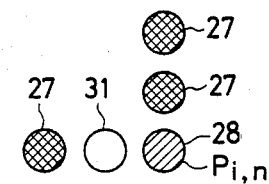
FIG. 12
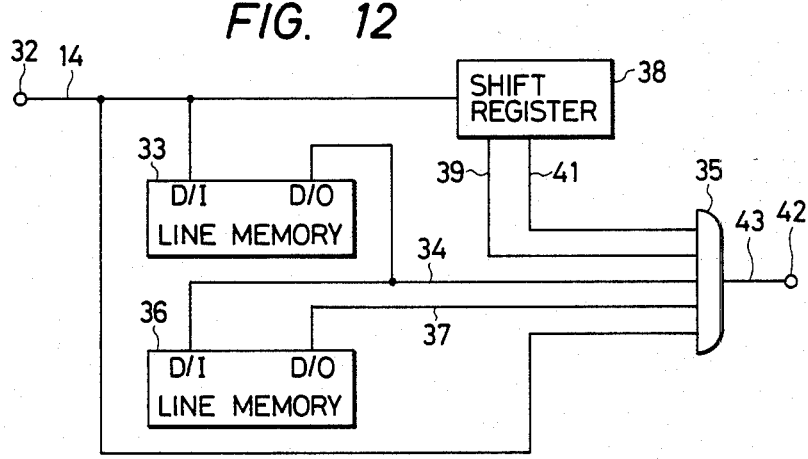
FIG. 13(a)
FIG. 13(b)
FIG. 13(c)

COLOR PICTURE READING SYSTEM

BACKGROUND OF THE INVENTION

This invention relates to a color picture reading system for use in reading a color picture from the original by utilizing a plurality of image sensors, and more particularly, to a color picture reading system which can avoid the erroneous reading of the color picture due to errors in relative mechanical positions of the image sensors.

In a multicolor reading apparatus for use in reading color pictures from the originals, a plurality of image pick-up elements are used to convert optical images of the same original in different ranges of wave length into electrical signals, respectively. The signals obtained are processed to form picture signals.

FIG. 1 shows a known arrangement of an optical system for a multicolor reading apparatus capable of reading two colors; red and black. In this apparatus, light from a pair of fluorescent lamps 2, 3 illuminates the original 1 and is reflected therefrom towards a half mirror 4. The light transmitted through the half mirror 4 is focused by a lens 5 onto a first image sensor 6. The light reflected by the half mirror 4 passes through a cyanic filter 7 which removes the red color therefrom. This light is focused by a lens 8 onto a second image sensor 9.

As shown in FIG. 2, the first and second image sensors 6 and 9 convert the exposed optical images into electrical signals 11 and 12, respectively. As one example the output picture signals may have 1728 bits per scanning line. The picture signals 11 and 12 are applied to an operational circuit 13 and subjected to predetermined processing, so that a first video signal 14 representing the picture information of red and a second video signal 15 representing the picture information of black are output from the circuit 13.

FIG. 3 shows a typical example of such operational circuit. The picture signal 11 from the first image sensor 40 is led to a first comparator 16 and compared with reference voltage $V_1$. As will be seen from FIG. 4a, the reference voltage $V_1$ is selected to be lower than a white (background) level $11_H$ and a red level $11_R$ of the picture signal 11, so that the first comparator 16 outputs the second video signal 15 (FIG. 4b) in the form of a binary signal wherein the black picture information is represented by the low level of the signal. The picture signal 12 output from the second image sensor is led to a second comparator 17 and compared with reference voltage $V_2$, selected to be slightly lower than the white level $12_H$. Since the picture signal 12 (FIG. 4c) includes almost no red component of wave length, the latter having been removed by the cyanic filter, there is obtained a binary signal 18 (FIG. 4d) in which the white picture information only assumes an H (high) level. Binary signal 18 is inverted by an inverter 19 and thereafter applied to an input terminal of a 2-input NAND circuit 21 together with the second video signal 15 led to the other input terminal thereof. As a result, the NAND circuit 21 issues from its output terminal the first video signal 14 in which the picture information of red only assumes the signal state of an L (low) level.

In color picture reading systems of the type described, ideal color separation will not always take place and, on some occasions, the boundary portion between different colors on the original may be erroneously separated into another false color. This results from errors in mechanically adjusted positions of the respective image sensors. More specifically, in the optical system shown in FIG. 1, as an example, if the first image sensor 6 and the second image sensor 9 do not precisely correspond with respect to the original in their output bit relationship, the two picture signals 11, 12 (FIGS. 5a, b) are subject to a shift in time by one or more bits. When there occurs a time shift between the picture signals 11 and 12, the operational circuit 13 performs the erroneous operation in connection with the shifted portions 22 to 25. As a result, in the case of employing the operational circuit as shown in FIG. 3, the shifted portion 22 at the boundary from black to white would be erroneously separated and, would appear as red.

Such error in color separation occurs normally by a degree of 1 to 2 bits in the main scanning direction and the sub-scanning direction. FIG. 6 shows one example of how noise (red in this case) occurs in the prior art, with the picture information varying along the main scanning direction in the sequence white, black and white. FIG. 7 shows one example of how noise (also red in this case) occurs in the prior art, with the picture information varying along the sub-scanning direction in the sequence white, black and white. In each example the main scanning direction is assumed to be the horizontal direction and the sub-scanning direction is assumed to be the vertical direction. The error resulting from misalignment, as indicated above, is shown on the right hand side in each of FIGS. 6 and 7. This error in color separation results in a remarkable reduction in quality of the reproduced picture appearing on a recording apparatus or a display screen.

SUMMARY OF THE INVENTION

In accordance with the present invention there is provided a color image reading system in which errors in color separation will not be caused even when the image sensors are subject to some degree of shift in the mechanical positions thereof.

With reference to FIG. 8, which illustrates adjacent picture elements on scanning rows $i-1$, $i$, and $i+1$, the broad principles of the invention can be understood. In accordance with the invention, the decision or determination of the color of any given picture element, is based on the previously decided color signals of certain surrounding picture elements. For example, the decision of the color of picture element $P_{i,n}$ might be based upon the color of $P_{i-1,n}$ or $P_{i,n-1}$. In other words, the object of this invention is achieved by a system such that when the larger number of bits than that corresponding to a relative shift in mechanical positions of the image sensors are separated into the same color without a break, it will be decided that such bits assume the properly separated color, thus preventing the erroneous color separation due to a relative shift in mechanical positions.

BRIEF DESCRIPTION OF THE DRAWINGS

FIG. 1 is a schematic view of optical system in a multicolor reading apparatus used for reading two colors; red and black.

FIG. 2 is a block diagram of a circuit for separation of the picture signals in the apparatus shown in FIG. 1.

FIG. 3 is a detailed block diagram of an operational circuit included in the circuit shown in FIG. 2.

FIG. 4 is an illustration of respective wave forms for explaining the signal processing in the operational circuit shown in FIG. 3.

FIGS. 9, 10, 11a and b, 13a–c, 14a–c and 16a and b illustrate the relationship of close by picture elements and is helpful in understanding the invention.

FIG. 12 is a block diagram of a color picture reading correction circuit in accordance with one embodiment of the invention.

DETAILED DESCRIPTION OF THE PREFERRED EMBODIMENT

Figure 5:
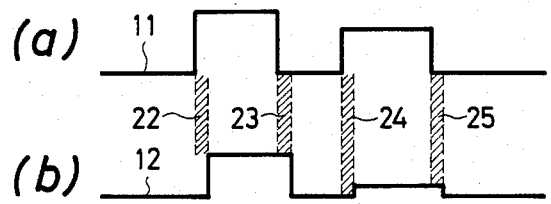
FIG. 5 is an illustration of wave forms for explaining errors in color separation experienced with a color picture reading system in the prior art.
Figure 6:
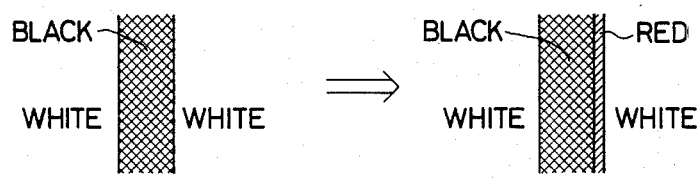
FIG. 6 is a plan view showing how the red noise appears in the main scanning direction in the prior art system.
Figure 7:
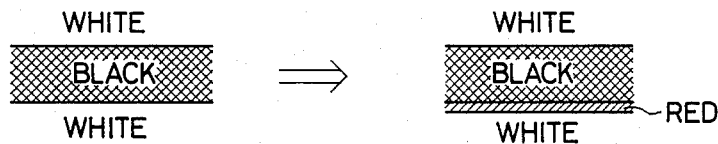
FIG. 7 is a plan view showing how the red noise appears in the sub-scanning direction in the prior art system.
Figure 8:
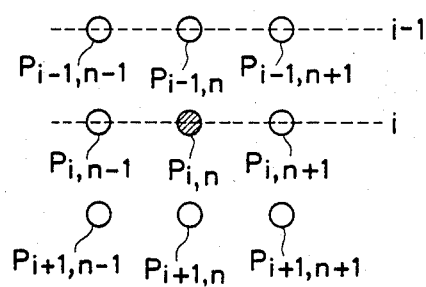
FIG. 8 is an illustration showing an array of the respective picture elements for explaining the principle of the invention.
Figure 9:
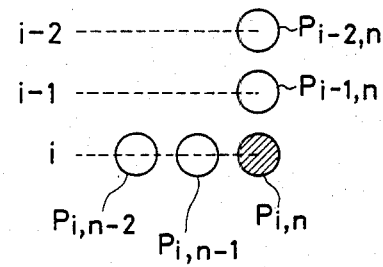

FIG. 9 illustrates the surrounding picture elements to be used in the decision process in a first embodiment. In this embodiment, the color signals used to determine the color of $P_{i,n}$ are those for two picture elements $P_{i-1,n}$, $P_{i-2,n}$ at the same position in the main scanning direction located on two respective scanning lines $i-1$, $i-2$ prior to that of the picture element $P_{i,n}$ now under the color decision process, and those for the two picture elements $P_{i,n-1}$, $P_{i,n-2}$ located on the same scanning line i at positions preceding the picture element $P_{i,n}$ by one and two bits, respectively. Reference to the color signals for the preceding two bits in both the main scanning and sub-scanning direction is based on the assumption that there exists an error of two bits in the relative mechanical positions of the image sensors in both directions.

In the color picture reading system according to this embodiment, as will be seen from FIG. 10, when all four picture elements $P_{i-2,n}$, $P_{i-1,n}$, $P_{i,n-2}$ and $P_{i,n-1}$ surrounding the picture element $P_{i,n}$ are determined to assume color signals 27, other than white (background), and the picture element $P_{i,n}$ is separated into a color signal 27 of the same color, the picture element $P_{i,n}$ is read out as the color signal 27. More specifically, not only when the picture element $P_{i,n}$ now under the color decision process is separated into a color signal 29 representing white as illustrated in FIG. 11A, but even when the picture element $P_{i,n}$ is separated into the color signal 28 as illustrated in FIG. 11B, the picture element $P_{i,n}$ is decided to assume a color signal 31 representing white if one or more of the aforesaid surrounding picture elements has been decided to assume the color signal 31 representing white.

FIG. 12 shows a typical example of a color picture reading correction circuit adapted to perform the reading as mentioned above. An input terminal 32 of this correction circuit is supplied with the first video signal 14 representing the red signal picture information, which was obtained through color separation from the operational circuit 13 shown in FIG. 2. As stated above, the first video signal 14 includes therein a component due to shifts in mechanical positions of the image sensors. The first video signal 14 is applied to a data input terminal D/I of a one-line-earlier line memory 33 designed to store a single line of video signals. The memory 33 outputs from its data output terminal D/O a one-line-delayed video signal 34 which has been obtained by delaying the input signal by one line. The one-line-delayed video signal 34 is supplied to one input terminal of a 5-input AND circuit 35 and is also applied to a data input terminal D/I of a two-line-earlier line memory 36 designed to store a single line of video signal. In synchronism with the above, the two-line-earlier memory 36 outputs from its data output terminal D/O a two-line-delayed video signal 37 which has been obtained by delaying the input signal by one line additionally, the video signal 37 being applied to another input terminal of the AND circuit 35.

The first video signal 14 is also supplied to an input terminal of the AND circuit 35 and a shift register 38. The shift register 38 outputs a one-bit-delayed signal 39, which has been obtained by delaying the input signal by one bit, and a two-bit-delayed signal 41, which has been obtained by delaying the input signal by two bits. These delayed signals 39 and 41 are applied to the remaining input terminals of the AND circuit 35, respectively. Therefore, the AND circuit 35 outputs from its output terminal 42 a properly corrected video signal 43 in the form of the logical product of the present bit, the one-bit-earlier bit, the two-bit-earlier bit, the one-line-earlier bit and the two-line-earlier bit, all of which have been applied to the input terminal 32 of the AND circuit 35.

Referring back to FIGS. 2 and 3, it will be recalled that the color separation video signal 14 is low (L) for a red color signal and high (H) for all other signals. The logic circuits of FIG. 12 are therefore negative logic. Thus, the AND circuit 35 provides a low (L) output only if all inputs are low (L). Alternatively, the signal 14 could be inverted and positive logic used. In either case, the picture element signal will only be outputted as a red color separation signal if the picture element signal is initially detected as red and each of the preceeding two bits in the scanning and sub-scanning directions have been detected as red.

Figure 14A:
Figure 14B:
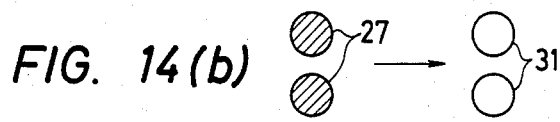
Figure 14C:
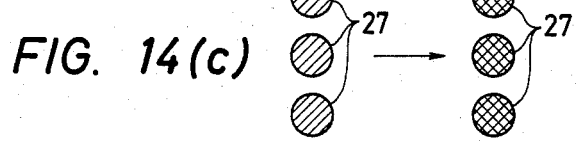

FIGS. 13 and 14 show a color picture reading system in accordance with a second embodiment of this invention. As illustrated in FIG. 13a, when only one bit is separated into the color signal 27 other than white (background) in the main scanning direction, this bit is read out after being corrected to the color signal 31 representing white. As illustrated in FIG. 13b, when two adjacent bits are separated into the color signals 27 other than white in the main scanning direction, the similar correction is performed. As illustrated in FIG. 13c, when three or more bits are successively separated into the color signals 27 other than white in the main scanning direction, all of these bits are decided to assume the color signals 27 of the same color and then read out. FIG. 14 shows the manner of reading in the sub-scanning direction. As illustrated in FIGS. 14a and 14b, when only one or two bits are successively separated into the color signals 28 other than white in the sub-scanning direction, these bits are read out after being corrected to the color signals representing white. On the other hand, as illustrated in FIG. 14c, when there occur three or more successive color signals 28, all of the bits are decided to assume the color signals 27 of the same color and then read out.

Figure 15:
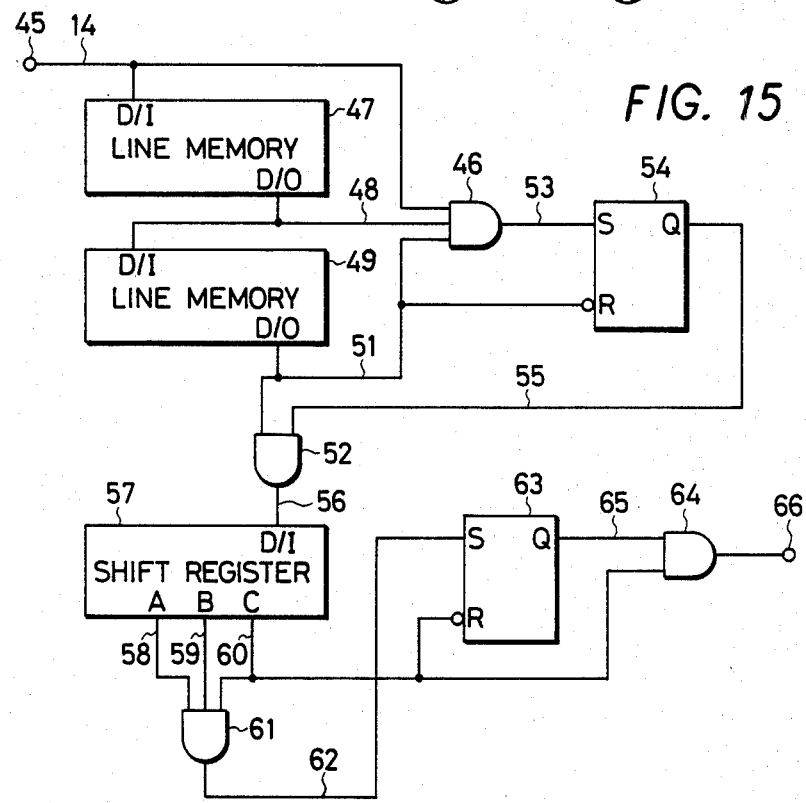
FIG. 15 is a block diagram of a color picture reading correction circuit in accordance with a second embodiment of the invention.

FIG. 15 shows a typical example of a color picture reading correction circuit adapted to perform the reading as mentioned above. As in the case of FIG. 12 negative logic is assumed. An input terminal 45 of this correction circuit is supplied with the first video signal 14 representing the red picture information, which was obtained through color separation from the operational circuit 13 shown in FIG. 2, similarly to the aforesaid first embodiment. The first video signal 14 is directly supplied to one input terminal of a 3-input AND circuit 46 and also applied to a data input terminal D/I of a one-line-earlier line memory 47 designed to store one line length of video signals. The one-line-earlier line memory 47 outputs from its data output terminal D/O a one-line-delayed video signal 48 which has been obtained by delaying the input signal by one line, in synchronism with the first video signal. Then, the one-line-delayed video signal 48 is led to another input terminal of the AND circuit 46 and a data input terminal D/I of a two-line-earlier line memory 49 designed to store the one line length of video signals. The two-line-earlier line memory 49 outputs from its data output terminal D/O a two-line-delayed video signal 51 which has been obtained by delaying the input signal by two lines, in synchronism therewith. The two-line-delayed video signal 51 is supplied to the remaining input terminal of the AND circuit 46 and is also applied to one input terminal of a 2-input AND circuit 52.

By so doing, the 3-input AND circuit 46 outputs a sub-scanning decision signal 53 at an H level, when there occur the video signals of red in three or more successive bits in the sub-scanning direction. A flip-flop circuit 54 receives at its set terminal S the sub-scanning decision signal 53 indicating that three successive video signals of red color information have been received in the sub-scanning direction. As the flip-flop circuit 54 is set, the flip-flop 54 is held in the set state unit the two-line-delayed signal 51 will be turned to a signal representing not red. On this occasion, a gate control signal 55 at an H level is supplied to the other input terminal of the AND circuit 52 from an output terminal Q of the flip-flop circuit 54. Therefore, the AND circuit 52 issues from its output side a video signal 56 representing red until the two-line-delayed video signal 51 will be again turned to a signal representing not red (e.g., white). The red noise mixed in the sub-scanning direction is eliminated through the circuit leading from the input terminal 45 to the AND circuit 52 as mentioned above.

The video signal 56 deprived of the red noise in the subscanning direction is led to a data input terminal D/I of a shift register 57. Upon this, the shift register 57 issues from its three data output terminals A, B and C video signals 58, 59 and 60. The video signal 59 is delayed by one bit in the main scanning direction and the video signal 60 is delayed by two bits in the same direction. These video signals 58 to 60 are led to a 3-input AND circuit 61. Therefore, the AND circuit 61 outputs from its output terminal a main scanning decision signal 62 at an H level, only when there occur the video signals of red color in three or more successive bits.

A flip-flop circuit 63 receives this main scanning decision signal 62 at its set terminal S and is set thereby. As the flip-flop circuit 63 is set, a gate control signal 65 is applied to one input terminal of a 2-input AND circuit 64 from an output terminal Q of the flip-flop circuit 63. The AND circuit 64 receives the video signal 60 at its other input terminal and outputs the video signal 60 to an output terminal 66, until the video signal 60 represents not red and the flip-flop circuit 63 will be reset. Thus, when three successive bits of red are detected in the main scanning direction, a red bit is issued from the output terminal 66 for three bits after that successive state has been confirmed by the AND circuit 61. In such a manner, the red noise mixed in the main scanning direction is also eliminated.

As fully described hereinabove, according to this invention, the color picture is corrected by processing the signals electronically, so that it is not necessary to mechanically adjust the positions of the image sensors with extremely high precision and the color picture reading apparatus can be manufactured at a lower cost.

Figure 16A:
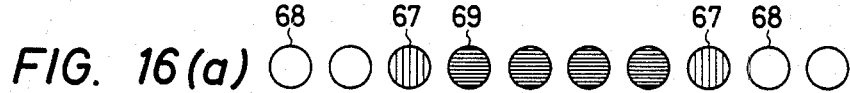
Figure 16B:
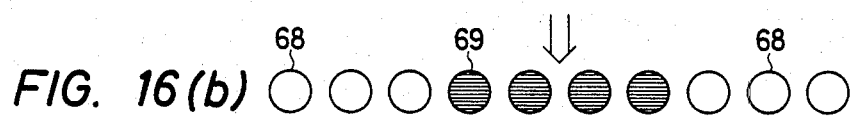

In the foregoing embodiments, the correction is made by counting the number of successive bits of red picture signal. However, in view of the fact that red noise 67 appears at the boundary between white signals 68 and black signals 69 as shown in FIG. 16a, it is also practicable to eliminate the red signals of one or two bits adjacent to the black signals 69 as shown in FIG. 16b. This makes it possible to reduce the possibility of a fear that red fine lines would be deleted, and to achieve the superior reading of the color picture. It will be naturally understood that when the red noise occurs on one side adjacent to the picture signals of black as seen in the aforesaid embodiment, the red signal is eliminated on that one side only, thereby to permit the more superior reading of the color picture.

Furthermore, color decision has been performed by referring to the video signals for each two bits in the main scanning direction and the sub-scanning direction, respectively, in the embodiments as stated above. But this invention is not limited to such color decision. The Table below shows the relationship between the conditions to eliminate noise and the correction amount. As will be seen from the Table, it is possible to select the optimum method among those from No. 1. to No. 8 in accordance with the degree of error in the mathematical positions of the image sensors. The method of No. 9 illustrates the case where no correction is necessary due to absence of errors in the image sensor positions. In the Table, the mark X means those signals that will not be used in the correction process.

TABLE

| Correction Method | $P_{i,n}$ | $P_{i,n-2}$ | $P_{i,n-1}$ | $P_{i-2,n}$ | $P_{i-1,n}$ | Correction Amount (bit) | |
|---|---|---|---|---|---|---|---|
| | | | | | | Main Scanning | Sub-Scanning |
| No. 1 | red | red | red | red | red | 2 | 2 |
| No. 2 | red | red | red | X | red | 2 | 1 |
| No. 3 | red | red | red | X | X | 2 | 0 |
| No. 4 | red | X | red | red | red | 1 | 2 |
| No. 5 | red | X | X | red | red | 0 | 2 |
| No. 6 | red | X | red | X | red | 1 | 1 |
| No. 7 | red | X | red | X | X | 1 | 0 |
| No. 8 | red | X | X | X | red | 0 | 1 |
| No. 9 | red | X | X | X | X | 0 | 0 |

Furthermore, in the foregoing embodiments there has been described a multicolor reading apparatus designed to pick up the video signals of red and black. It is a matter of course, however, that this invention is applicable to a reading apparatus for picking up other colors and those multicolor reading apparatuses in which there or more colors will be separated from one another.

What is claimed:

1. A color separation system comprising:

means for electrooptically scanning an original to develop at least one binary first color picture information signal, each bit in said signal corresponding to a picture element of said original and having a first and second value representing first color and not first color, respectively, said signal comprising a successive line of bits representing scanned lines of said picture elements, and color correction means responsive to said binary first color picture information signal for generating a corrected first color picture information signal wherein certain noise bits of said first value in said uncorrected signal are changed to bits of said second value in said corrected signal, said color correction means comprising:

present bit detecting means for detecting the bit value of the present bit, representing a given picture element, occurring in said uncorrected signal, previous bit detecting means for detecting the bit values of selected previous bits, representing neighboring picture elements with respect to said given picture element, occurring in said uncorrected signal, means responsive to said latter two detecting means for correcting said present bit from a first value representing first color to a second value representing the absence of said first color unless said present bit in said uncorrected signal is said first value and selected ones of said previous bits have said first value, said previous bit detecting means comprises means for detecting the n preceding successive bits in the same scanning line as said present bit and for detecting one bit in each of the preceding m lines, each of said bits in said m lines being in positions in their respective lines corresponding to the positions of said present bit in its line, and wherein said numbers m and n need not be equal.

2. A color separation system as claimed in claim 1 wherein said previous bit detecting means comprises, a shift register connected to receive said uncorrected signal and shift the bits of said uncorrected signal, said shift register providing n outputs representing the n values, respectively, of the n previous bits of said uncorrected signal, a plurality of m lines memories connected in series, each said line memory having a delay between input and output equal to the time of a line of bits of said signal, the first of said line memories being connected to receive at its input said uncorrected signal, and wherein said means for correcting comprises logic circuit means responsive to input signals applied thereto for developing an output corrected signal which is a predetermined logic combination of said input signals, said n outputs of said shift register and said m outputs of said m line memories being applied as inputs to said logic circuit, and wherein said present bit detecting means comprises means connecting said uncorrected signal as one input to said logic circuit.

3. A color separation system as claimed in claim 2 wherein said logic circuit is an AND gate, whereby all inputs to said logic circuit must be bits representing said first color for the output to be a bit representing said first color.

4. A color separation system as claimed in claim 3 wherein $n=m=2$.

5. A color separation system comprising:

means for electrooptically scanning an original to develop at least one binary first color picture information signal, each bit in said signal corresponding to a picture element of said original and having a first and second value representing first color and not first color, respectively, said signal comprising a successive line of bits representing scanned lines of said picture elements, and first means responsive to said uncorrected signal for detecting the bit values of a present bit and m previous corresponding bits in m succeeding lines, respectively, and for generating a partially corrected signal, said partially corrected signal having bits of said first value indicating said first color only when said present bit and all said m bits are detected as having said first value, and second means responsive to said partially corrected signal for detecting the bit values of a present bit of said partially corrected signal and the preceding n bits of said partially corrected signal and for generating a corrected signal, said corrected signal having bits of said first value indicating said first color only in the following cases:

(a) said present bit and all said n bits are detected as having said first value, (b) the distant of said n bits has said first value, and the just prior bit of the corrected signal has said first value.

6. A color separation system as claimed in claim 5 wherein said first means comprises:

a first AND gate having $m+1$ inputs, an input thereof being connected to receive said uncorrected signal, a plurality of m line memories connected in series, each having a delay between input and output corresponding to the length of a line of said uncorrected signal, the input of the first of said m memories being connected to receive said uncorrected signal, the output of each of said m line memories being applied as inputs to said first AND gate, a first flip-flop having a set input connected to the output of said first AND gate, a reset input connected to the output of the last of said m line memories, and an output indicating the state thereof, and a second AND gate having input terminals connected to the output of said first flip-flop and the output of the last of said m memories, whereby the output of said second AND gate is said partially corrected signal.

7. A color separation system as claimed in claim 6 wherein said second means comprises:

a shift register means responsive to said partially corrected signal for outputting the bit values of the present bit of said signal and the preceeding n bits thereof, a third AND gate having $n+1$ inputs connected to receive the latter mentioned outputs from said shift register means, a second flip-flop having a set input connected to receive the output of said third AND gate, a reset input connected to receive the output from said shift register means which represents the bit value of the oldest of said n bits, and an output, and a fourth AND gate having two inputs connected to the output of said second flip-flop and the last mentioned output from said shift register means, whereby the output from said fourth AND gate is said corrected signal.

8. A color separation system as claimed in claim 5, 6 or 7 wherein $m=n=2$.

* * * * *